(12) United States Patent
Hofsaess

(10) Patent No.: US 10,060,940 B2
(45) Date of Patent: Aug. 28, 2018

(54) SENSOR, SENSOR UNIT, AND METHOD FOR PRODUCING A SENSOR UNIT

(75) Inventor: Michael Hofsaess, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 14/235,100

(22) PCT Filed: Jun. 19, 2012

(86) PCT No.: PCT/EP2012/061638
§ 371 (c)(1),
(2), (4) Date: Jan. 27, 2014

(87) PCT Pub. No.: WO2013/023813
PCT Pub. Date: Feb. 21, 2013

(65) Prior Publication Data
US 2014/0196541 A1    Jul. 17, 2014

(30) Foreign Application Priority Data
Aug. 16, 2011   (DE) .......... 10 2011 080 971

(51) Int. Cl.
*G01P 1/00*     (2006.01)
*G01P 15/08*    (2006.01)
*G01P 3/14*     (2006.01)
*G01D 3/036*    (2006.01)

(52) U.S. Cl.
CPC .............. *G01P 1/003* (2013.01); *G01D 3/036* (2013.01); *G01P 3/14* (2013.01); *G01P 15/0802* (2013.01); *Y10T 29/49128* (2015.01)

(58) Field of Classification Search
CPC .. G01P 1/003; G01P 1/023; G01P 3/14; G01P 15/0802; G01P 15/08; G01C 19/56; G01C 19/5783; G01D 11/245; G01D 11/10; G01D 11/30

USPC ........ 73/493, 514.38, 530, 526, 430, 504.12
See application file for complete search history.

(56) References Cited

U.S. PATENT DOCUMENTS

| 6,121,675 | A  | * | 9/2000 | Fukamura | H01L 31/0203 257/680 |
| 6,798,053 | B2 | * | 9/2004 | Chiu | H01L 23/057 257/678 |
| 7,234,364 | B2 | * | 6/2007 | Ohta | G01C 19/5719 73/514.16 |
| 7,732,915 | B2 | * | 6/2010 | Dangelmaier | B81B 7/0058 257/704 |

(Continued)

FOREIGN PATENT DOCUMENTS

| DE | 10 2005 028 906 A1 | 12/2006 |
| DE | 10 2006 026 878 A1 | 12/2007 |

(Continued)

OTHER PUBLICATIONS

International Search Report corresponding to PCT Application No. PCT/EP2012/061638, dated Sep. 4, 2012 (German and English language document) (7 pages).

*Primary Examiner* — Helen Kwok
(74) *Attorney, Agent, or Firm* — Maginot, Moore & Beck LLP

(57) ABSTRACT

A sensor includes a sensor element configured to measure a physical variable. At least one elastic damping element is configured to damp external interfering vibrations. The at least one elastic damping element is configured to electrically and/or mechanically contact the sensor element.

9 Claims, 4 Drawing Sheets

(56) References Cited

U.S. PATENT DOCUMENTS

| | | | |
|---|---|---|---|
| 8,584,525 B2* | 11/2013 | Offterdinger | B81B 7/0058 73/514.38 |
| 9,263,395 B2* | 2/2016 | Jobert | H01L 23/5387 |
| 2004/0201464 A1* | 10/2004 | Oonishi | B60R 21/013 340/436 |
| 2005/0121758 A1* | 6/2005 | Di Stefano | H01L 24/72 257/678 |
| 2007/0222005 A1* | 9/2007 | Schmitt | B81B 7/0051 257/414 |
| 2009/0282915 A1* | 11/2009 | Ohta | B81B 7/0058 73/504.12 |
| 2010/0192689 A1* | 8/2010 | Ulm | B81B 7/0012 73/430 |
| 2010/0242605 A1* | 9/2010 | Offterdinger | B81B 7/0058 73/514.38 |

FOREIGN PATENT DOCUMENTS

| | | |
|---|---|---|
| DE | 10 2009 020 838 A1 | 11/2009 |
| DE | 10 2009 000 571 A1 | 8/2010 |
| DE | 10 2009 000 574 A1 | 8/2010 |
| DE | 10 2009 001 930 A1 | 9/2010 |
| DE | 10 2009 045 911 A1 | 4/2011 |
| DE | 10 2010 001 023 * | 7/2011 |
| EP | 1 443 331 A2 | 1/2004 |
| WO | 99/54683 A2 | 10/1999 |

* cited by examiner

SENSOR, SENSOR UNIT, AND METHOD FOR PRODUCING A SENSOR UNIT

BACKGROUND

This application is a 35 U.S.C. § 371 National Stage Application of PCT/EP2012/061638, filed on Jun. 19, 2012, which claims the benefit of priority to Serial No. DE 10 2011 080 971.6, filed on Aug. 16, 2011 in Germany, the disclosures of which are incorporated herein by reference in their entirety.

The disclosure relates to a sensor, especially for acceleration measurement or rotation rate measurement according to the type described below, as well as to a corresponding sensor unit according to the type described below, and to a corresponding method for manufacturing a sensor unit according to the type described below.

Sensors with at least one sensor element for measuring inertial variables, such as e.g. the acceleration and/or the rotation rate, are usually installed in modern safety systems. The acceleration and/or rotation rate sensors comprise oscillating masses that are operated in a specified frequency range. If noise variables or interference frequencies occur that lie in the specified frequency range and do not originate from the variable to be measured, such as e.g. oscillations of the drive, then the measurement function of the sensor can be adversely affected or completely disrupted. In many application cases in which a high signal quality is necessary and/or in which there is at least one noise source or interference frequency at the installation position, interruption of the chain of action of the interference is necessary. The chain of action of the interference can especially be interrupted at the circuit board on which the sensor with the sensor element is disposed.

In the published patent application DE 10 2009 001 930 A1 e.g. a sensor unit with a housing and a circuit board disposed within the housing, on which a sensor with a sensor element is disposed, are described. An elastomeric element, which connects the circuit board electrically and mechanically to the housing, is attached between the circuit board and the housing. Mechanical decoupling of the sensor element from the housing is achieved by the elastomeric element. Interference in the form of interference oscillations or interference frequencies, which can act on the housing, is damped by the elastomeric element. Furthermore, additional means for electrically contacting the circuit board can be saved as a result of the conducting elastomeric element.

In the published patent application DE 10 2009 000 571 A1, e.g. a sensor unit with a housing and a circuit board, on which a sensor with a sensor element is disposed and which is disposed in the housing, are described. The circuit board is implemented in a flexible form. Mechanical decoupling of the sensor element from the housing is achieved by the flexible circuit board. Interference frequencies that act upon the housing are damped by the flexible circuit board.

SUMMARY

The sensor according to the disclosure with the features described below has in contrast the advantage of comprising at least one elastic damping element, which advantageously damps externally acting interference oscillations or interference frequencies and comprises means for electrically and/or mechanically contacting the sensor element. This enables a sensor to be implemented as a damped spring-mass system that comprises at least one elastic damping element and the sensor element. Here the damping element is attached to the sensor element and forms the sensor with the sensor element. This enables the measuring sensor element to be effectively decoupled by means of the damping element from other assemblies that are present, such as e.g. a circuit board and/or a housing and/or an evaluation and control unit. During further processing the sensor according to the disclosure can be advantageously simply mounted from a band as a standard component. Because the sensor element is already damped in the sensor, it can be advantageously possible that the circuit board and/or the housing of a sensor unit do not have to be separately decoupled from or damped against unwanted external influences. This enables high signal quality to be achieved with restricted installation space or where there is no possibility for implementing damping of the housing and/or the circuit board. Furthermore, costs can be saved because the sensor can be installed in any sensor units without additional shielding and/or damping measures having to be provided.

Embodiments of the present disclosure provide a sensor, preferably an acceleration and/or rotation rate sensor. The sensor comprises a measuring sensor element, which preferably comprises an oscillating mass and is operated in a specified frequency range. According to the disclosure, the sensor comprises at least one elastic damping element that damps external interference oscillations or interference frequencies. The damping element is attached to the sensor element and comprises means for electrically and/or mechanically contacting the sensor element.

A sensor unit according to the disclosure, especially for acceleration and/or rotation rate detection in a safety-related vehicle system, comprises at least one circuit board, to which a sensor is attached by means of a suitable method such as e.g. welding, soldering, gluing and/or screwing. Interference oscillations or interference frequencies that introduce errors into the measurement results of the sensor element contained in the sensor are advantageously damped by at least one elastic damping element, which is disposed between the sensor element and the circuit board. The damping element is advantageously attached to the sensor element and comprises means for electrically and/or mechanically contacting the sensor element. This enables the measuring sensor element to be effectively decoupled by means of the damping element from other assemblies present in a sensor unit, such as e.g. a circuit board and/or a housing and/or an evaluation and control unit. The sensor according to the disclosure can be mounted in a sensor unit by means of the electrical and/or mechanical contacting means.

With the method according to the disclosure for manufacturing a sensor unit, which comprises a circuit board and a sensor with a sensor element, the sensor element of the sensor is connected to at least one elastic damping element, wherein the sensor element is electrically and/or mechanically connected to the circuit board by means of the electrical and/or mechanical contacting means of the at least one damping element. Embodiments of the method according to the disclosure are flexible, because a plurality of attachment options between the damping element and the circuit board can be used. Thus the elastic damping element can e.g. be soldered, welded, glued or crimped onto the circuit board without the sensor element that is connected to the damping element being damaged.

Advantageous improvements of the sensor specified in the description below and of the method specified in the description below are possible by means of the measures and developments mentioned in the description below.

It is particularly advantageous that at least one elastic damping element for electrically and/or mechanically contacting the sensor element can comprise at least one spring element with at least one contact element. The spring element can e.g. be implemented with two contact areas. In this case the sensor element can be attached to a first contact area. The sensor can be attached to a circuit board within a sensor unit by means of a second contact area. The spring element can advantageously be made of an electrically conductive, non-corrosive material that is well suited to being soldered and the sensor element is electrically connected to the circuit board, so that an electric data exchange between the sensor and an evaluation and control unit that is disposed on the circuit board is advantageously enabled. Furthermore, the damping of the unwanted oscillations or frequencies can advantageously be adjusted within wide limits by selecting the material of the spring element. In addition, the spring element advantageously results in low material costs.

In an advantageous embodiment of the sensor according to the disclosure, the at least one spring element can be implemented as a stamped and bent part. This enables inexpensive mass production of the spring element.

In another advantageous embodiment of the sensor according to the disclosure, the spring element can be enveloped by an elastic damping material that is preferably implemented as a liquid silicon rubber (LSR). The LSR material can advantageously completely fill spaces of a specified shape in which the at least one spring element is placed. This enables the sensor to be placed in almost any external shape. Furthermore, the LSR Material has damping and insulating properties that protect the conducting spring element and/or prevent electric short circuits and/or support the damping behavior of the spring element.

With another advantageous embodiment of the sensor according to the disclosure, the at least one elastic damping element can be implemented as a conductive glue connection having a specified viscosity and/or ductility. Advantageously, with said embodiment at least one production step is omitted, because the electrical or mechanical contacting of the sensor, e.g. with a circuit board of a sensor unit, and the introduction of the elastic damping material can take place in one production step.

In another advantageous embodiment of the sensor according to the disclosure, the sensor element measures an acceleration and/or a rotation rate. Advantageously, said sensor elements, which are susceptible to failure, can be reliably protected by the elastic damping element against interference oscillations or interference frequencies. In addition, small, simply installed sensors for safety-related vehicle systems can be provided.

In an advantageous embodiment of the method according to the disclosure for manufacturing a sensor unit, the elastic damping element can be made of at least one spring element with at least one contact element, wherein the at least one spring element is manufactured by a stamping and bending process and following connection to the sensor element can be cast with an elastic damping material. In this case, the contact element of the at least one spring element that is connected to the circuit board is omitted during the casting. Another contact element of the spring element can be connected to the sensor element. Advantageously, the sensor, which comprises the sensor element and the damping element, can be attached to almost any surface, whereby the sensor units can be individually adapted to the installation environment.

In an alternative embodiment of the method according to the disclosure for manufacturing a sensor unit, the at least one elastic damping element is implemented as a conductive glue connection with a specified viscosity and/or ductility. The conductive glue can be placed between the circuit board and the sensor element in order to connect the sensor element electrically and mechanically to the circuit board. Advantageously, this enables an inexpensive damping element and simple electrical and/or mechanical contacting to be achieved. Furthermore, the manufacturing costs can be reduced by omitting at least one manufacturing step. Less installation space is also necessary with this embodiment.

Exemplary embodiments of the disclosure are illustrated in the figures and are explained in detail in the subsequent description. In the figures the same reference characters denote components or elements that perform the same or analogous functions.

DETAILED DESCRIPTION

Figure 1:
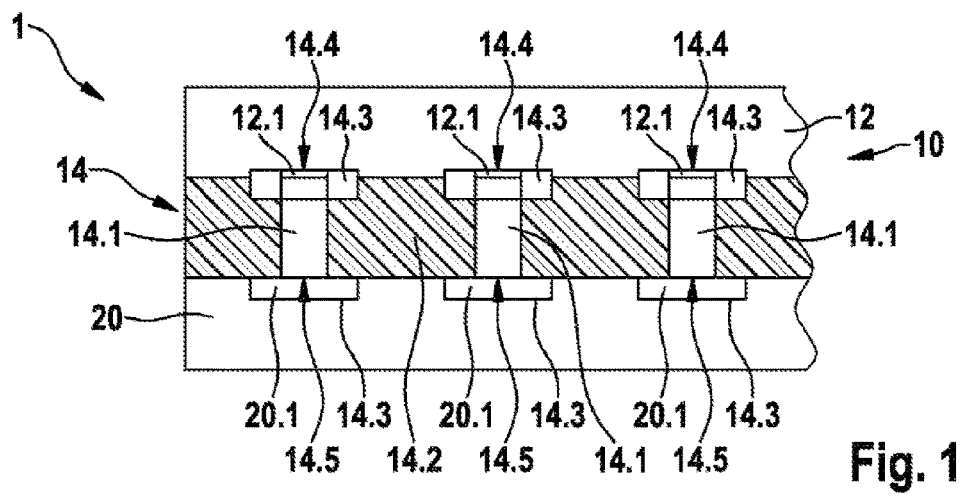
FIG. 1 shows a schematic sectional illustration of an exemplary embodiment of a sensor unit according to the disclosure.

As can be seen from FIGS. 1 to 10, the illustrated exemplary embodiments of a sensor unit 1, 1' each comprise a circuit board 20, 20' and a sensor 10, 10' with a sensor element 12, 12' for measuring a physical variable.

According to the disclosure the sensor 10, 10' comprises at least one elastic damping element 14, 14', which damps external interference oscillations or interference frequencies, and means 14.1, 14.1' for electrical and/or mechanical contacting of the sensor element 10, 10'. The elastic damping element 14, 14' is disposed between the circuit board 20 and the sensor element 12 and together with the sensor element 12, 12' forms the sensor 10, 10' in the illustrated exemplary embodiment.

As can also be seen from FIGS. 1 to 9, the elastic damping element 14 comprises at least one spring element 14.1 with two contact elements 14.3 in a first exemplary embodiment. All spring elements 14.1 of the elastic damping element 14 are each connected by means of a first contact area 14.4 of a first contact element 14.3 to a corresponding first contact area 12.1 of the sensor element 12. The first contact areas 14.4 of the individual spring elements 14.1 can be pressed, glued, soldered, welded or crimped onto the corresponding first contact areas 12.1 of the sensor element 12. Each spring element 14.1 is connected to the circuit board 20 of the sensor unit 1 by means of a second contact area 14.5 of a second contact element 14.3. Any suitable connecting technology, such as e.g. pressing, gluing, soldering, welding or crimping, can be used for said connection.

As can also be seen from FIG. 1, the individual spring elements 14.1 are enveloped by an elastic damping material 14.2, which is implemented as liquid silicon rubber (LSR). This preferably has insulating properties and can perform an additional protection and damping function. With alternative, non-illustrated embodiments of a sensor according to the disclosure, the elastic damping element can comprise only the spring element 14.1, which is attached to the sensor element 12.

Figure 2:
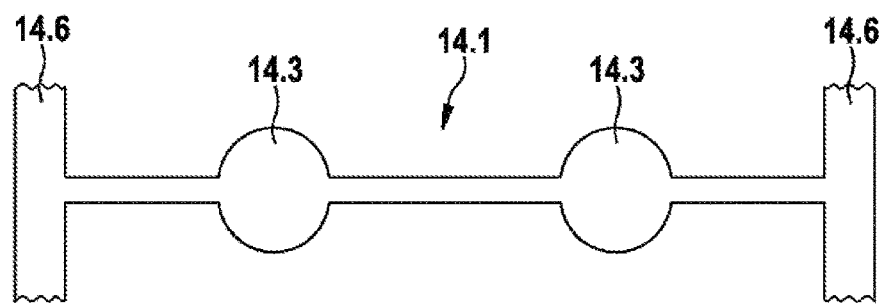
FIG. 2 shows a schematic illustration of a spring element for the sensor unit according to the disclosure of FIG. 1 in a first manufacturing state.
Figure 3:
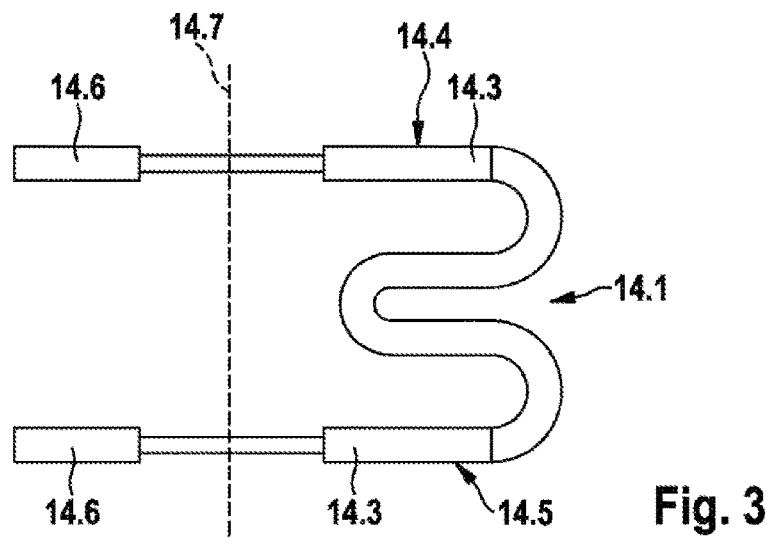
FIG. 3 shows a schematic illustration of the spring element of FIG. 2 in a second manufacturing state.

As can also be seen especially from FIGS. 2 and 3, the spring element 14.1 is made in a stamping and bending process from a sprung band material with a preferably electrically highly conducting, non-corrosive surface that is well suited to soldering. In this case, in a first step a plurality of spring elements 14.1 with two contact elements 14.3 are stamped out of a suitable band material, wherein the individual spring elements 14.1 are respectively connected to each other at both ends by means of a suitable connecting band 14.6. By means of a two-time bending process the connecting bridge between the two contact elements 14.3 is formed into a spring, wherein residual mounting bridges between the individual contact elements 14.3 and the connecting band 14.6 facilitate the further manufacturing. In a later manufacturing step the mounting bridges are separated along a cut line 14.7 that is shown as a broken line.

Instead of the described spring geometry and the described manufacturing process for manufacturing the spring elements 14.1, other geometries, such as e.g. small coil springs or other suitable manufacturing processes are conceivable for manufacturing the spring elements 14.1.

Figure 4:
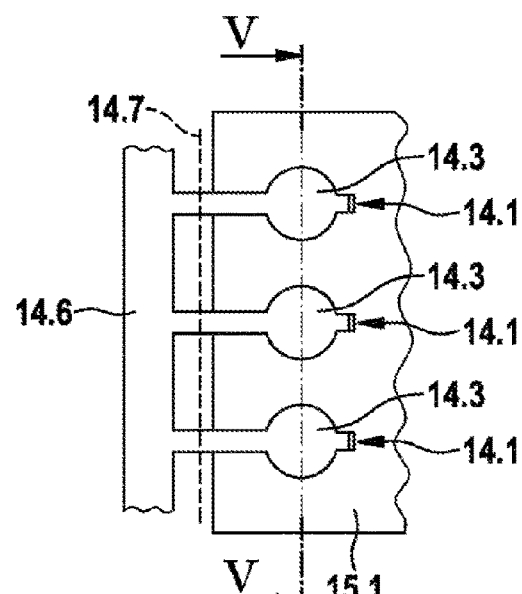
FIGS. 4 and 5 show respectively a schematic illustration of the spring element of FIG. 2 or 3 after placement in a tool mold for manufacturing a sensor for the sensor unit according to the disclosure of FIG. 1
Figure 5:
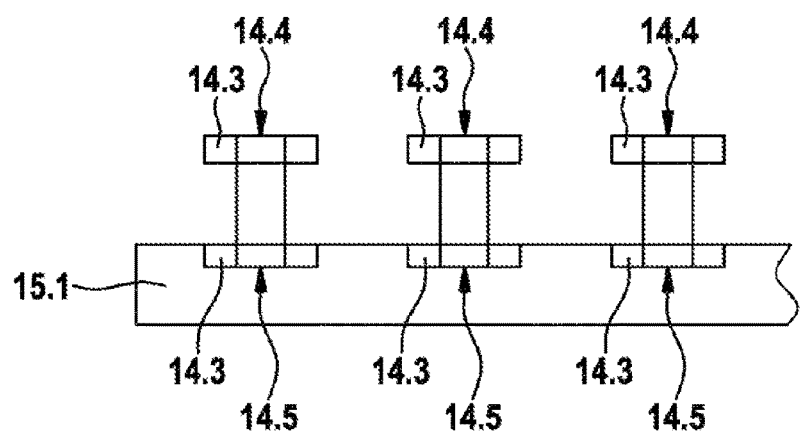

As can also be seen from FIGS. 4 and 5, a section of the band material, which comprises a plurality of spring elements 14.1, is placed in a tool mold 15.1 having cut-outs for the contact elements 14.3 for manufacturing the sensor 10.

Figure 6:
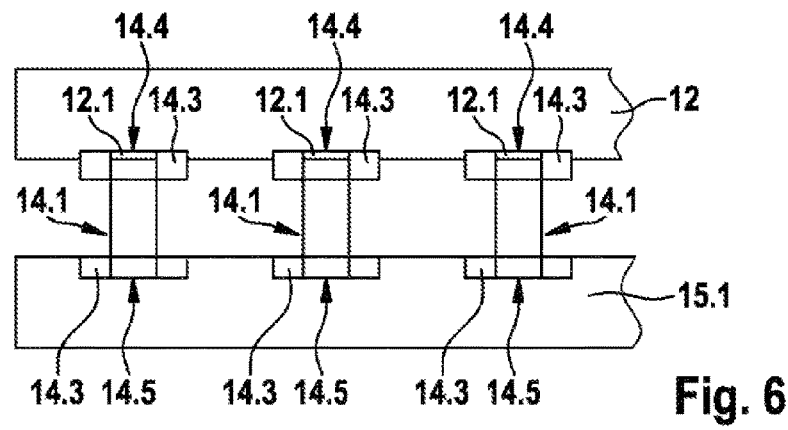
FIG. 6 shows a schematic illustration of the sensor for the sensor unit according to the disclosure of FIG. 1 in a first manufacturing state.

As can also be seen from FIG. 6, the sensor element 12, which is preferably implemented as an acceleration and/or rotation rate sensor element and comprises a non-illustrated oscillating mass as well as a plurality of first contact areas 12.1, is placed on the spring elements 14.1 such that the first contact areas 14.4 of the contact elements 14.3 essentially align with the first contact areas 12.1 of the sensor element 12. Then the first contact areas 14.4 of the contact elements 14.3 are joined to the first contact areas 12.1 of the sensor element 12. In the illustrated exemplary embodiment the first contact areas 14.4 of the spring elements 14.1 are soldered to the first contact areas 12.1 of the sensor element 12, wherein the at least one spring element 14.1 generates a certain application pressure in order to enable a reliable soldering process.

Figure 7:
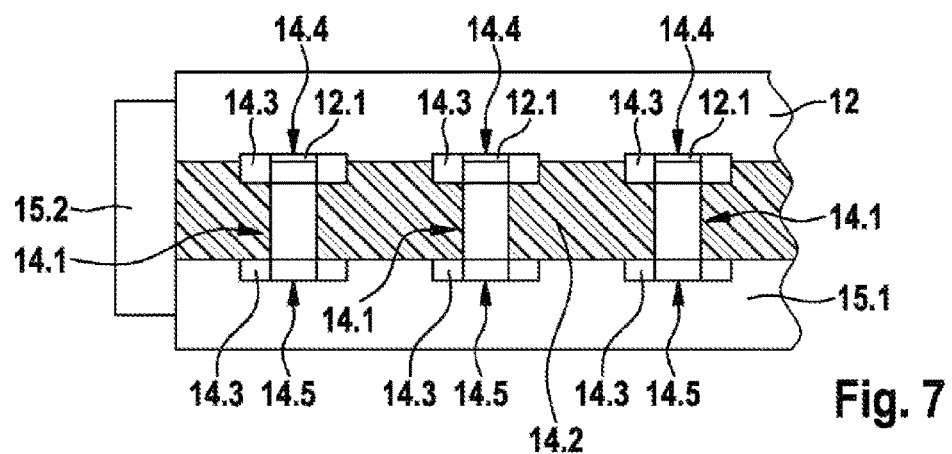
FIG. 7 shows a schematic illustration of the sensor of FIG. 6 in a second manufacturing state.
Figure 8:
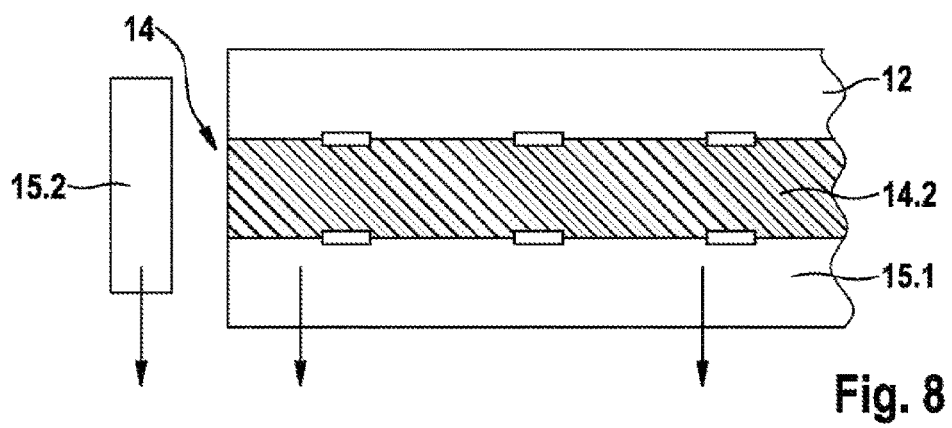
FIG. 8 shows a schematic illustration of the sensor for the sensor unit according to the disclosure of FIG. 1 in a third manufacturing state.

As can also be seen from FIG. 7, the tool mold 15.1 is closed by other tool molds 15.2, forming a closed space in the region of the spring elements 14.1 between the sensor element 12 and the tool mold 15.1 that is filled with damping material 14.2, especially liquid silicon rubber. Complete filling of the space via air channels is ensured, so that the spring element 14.1 is completely enveloped by the damping material 14.2. In addition, measures can be taken, e.g. by suitably shaping the tool mold 15.1, to omit the contact elements 14.3 of the spring elements 14.1 that are connected to the contact areas 20.1 of the circuit board 20 during filling of the space. The tool molds 15.1, 15.2 are removed before the LSR material or the damping material 14.2 has hardened, as can also be seen from FIG. 8. The connecting bands 14.6 are thereby separated from the contact elements 14.3 along the cutting line 14.7 shown in FIGS. 3 and 4. Then the LSR material or the damping material 14.2 is hardened in a temperature oven. The elastic damping element 14 is then joined to the sensor element 12 and part of the sensor 10. The sensor 10 can now either be fed to final testing or to a taping means for further processing.

Figure 9:
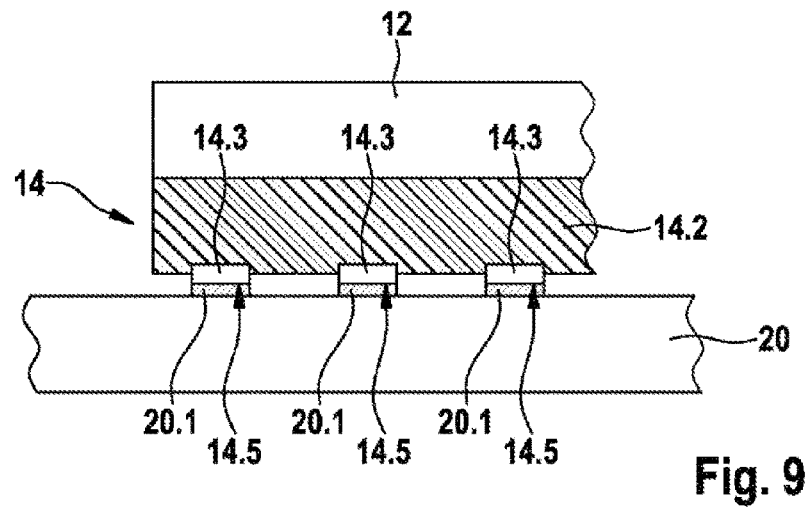
FIG. 9 shows a schematic illustration of the sensor unit according to the disclosure of FIG. 1 in a first manufacturing state.

As can also be seen from FIG. 9, the finished sensor 12 can be electrically and/or mechanically connected by means of the second contact areas 14.5 of the second contact elements 14.3 to the second contact areas 20.1 of the circuit board 20. In addition, the circuit board can be damped by means of other, non-illustrated damping elements, which can be attached between a non-illustrated housing and the circuit board 20. In addition, other components and assemblies, such as e.g. an evaluation and control unit, are placed on the circuit board 20 in order to complete the sensor unit 1.

Figure 10:
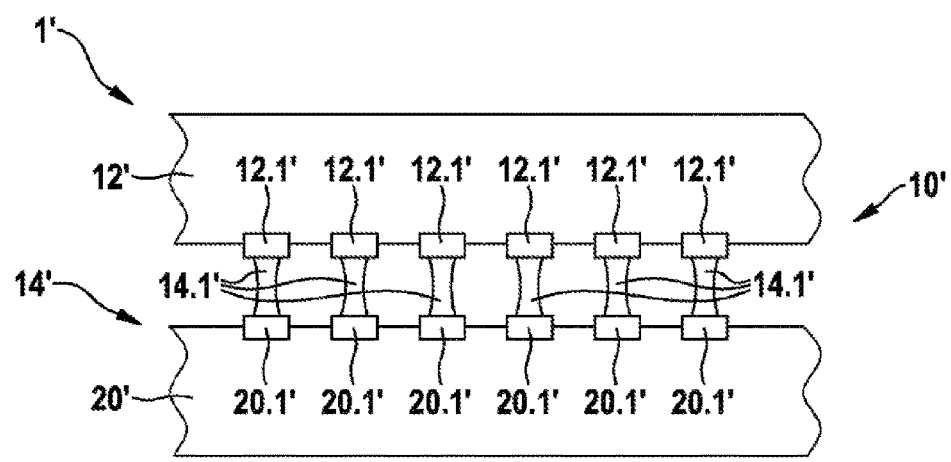
FIG. 10 shows a schematic sectional illustration of another exemplary embodiment of a sensor unit according to the disclosure.

As can also be seen from FIG. 10, the illustrated second exemplary embodiment also comprises an elastic damping element 14' that is disposed between the sensor element 12' and the circuit board 20'. In contrast to the first exemplary embodiment the elastic damping element 14' comprises a plurality of conductive glue connections 20.1' having a specified viscosity and/or ductility. An electrical and mechanical connection between the first contact areas 12.1' of the sensor element 12 and the second contact areas 20.1' of the circuit board 20' are provided in this way, wherein the conductive glue also performs a damping function. The conductive glue for the conductive glue connections 14.1' is selected such that following hardening the necessary viscosity and ductility are provided in order to implement the spring mass system with the sensor element 12 as a mass and the conductive glue points as a damping element 14'. The advantages of the second exemplary embodiment are the very low costs and a low structural height. Any strong temperature dependencies and high requirements on the application of the conductive glue must be taken into account here.

For manufacturing the sensor unit 1', which comprises the circuit board 20' and the sensor 10' with the sensor element 12', which is preferably implemented as an acceleration and/or a rotation rate sensor element 12 and comprises an oscillating mass and a plurality of first contact areas 12.1', conductive glue with a specified viscosity and ductility is introduced in each case between the first contact areas 12.1' of the sensor element 12' and the corresponding second contact areas 20.1' of the circuit board 20'. The conductive glue is then hardened. The hardened conductive glue of the individual conductive glue connections 14.1' acts as an elastic damping element 14' and also forms with the sensor element 12' a spring mass system that damps unwanted interference oscillations or interference frequencies.

The invention claimed is:
1. A sensor, comprising:
  a sensor element configured to measure a physical variable;
  at least one elastic damping element configured to damp external interference oscillations and configured to electrically and/or mechanically contact the sensor element; and a circuit board, wherein:
the at least one elastic damping element includes at least one spring element with at least one contact element,
the at least one contact element is arranged in direct contact with the sensor element,
the at least one elastic damping element mechanically decouples the sensor element from the circuit board, and
the at least one spring element is a stamped and bent part.

2. The sensor as claimed in claim 1, wherein the at least one spring element is enveloped by an elastic damping material.

3. The sensor as claimed in claim 1, wherein the at least one elastic damping element is an elastic conductive glue connection having a specified viscosity and/or ductility.

4. The sensor as claimed in claim 1, wherein the sensor element is configured to measure an acceleration and/or a rotation rate.

5. A sensor unit, comprising:
a sensor, including:
a sensor element configured to measure a physical variable; and
at least one elastic damping element configured to damp external interference oscillations and configured to electrically and/or mechanically contact the sensor element; and
a circuit board on which the sensor is disposed,
wherein the sensor is disposed on the circuit board by a direct mechanical coupling between the at least one elastic damping element and the sensor element, and
wherein the at least one elastic damping element mechanically decouples the sensor element from the circuit board.

6. A method for manufacturing a sensor unit having a circuit board and a sensor with a sensor element, the method comprising:
connecting the sensor element of the sensor to at least one elastic damping element; and
connecting the sensor element to the circuit board via electrical and/or mechanical contact with the at least one elastic damping element such that the at least one elastic damping element mechanically decouples the sensor element from the circuit board, wherein:
the at least one elastic damping element is made of at least one spring element with at least one contact element, and
the at least one spring element is manufactured in a stamping and bending process.

7. The method for manufacturing a sensor unit as claimed in claim 6, wherein:
the at least one spring element is cast with an elastic damping material following connection to the sensor element, and
the contact element is omitted during casting of the at least one spring element.

8. The method for manufacturing a sensor unit as claimed in claim 6, wherein:
the at least one elastic damping element is at least one conductive glue connection having a specified viscosity and/or ductility, and
the at least one conductive glue connection is introduced between the circuit board and the sensor element to connect the sensor element electrically and mechanically to the circuit board.

9. The sensor as claimed in claim 2, wherein the elastic damping material is liquid silicon rubber.

* * * * *